US008631321B2

(12) United States Patent
Friedman et al.

(10) Patent No.: US 8,631,321 B2
(45) Date of Patent: Jan. 14, 2014

(54) CONTENT AUTHORING SYSTEM AND METHOD

(75) Inventors: Maury Friedman, Agana Hills, CA (US); Daniel Bouganim, Agoura, CA (US); Yarone Goren, Oak Park, CA (US)

(73) Assignee: Academy 123, Inc., Westlake Village, CA (US)

( * ) Notice: Subject to any disclaimer, the term of this patent is extended or adjusted under 35 U.S.C. 154(b) by 1103 days.

(21) Appl. No.: 11/153,784

(22) Filed: Jun. 15, 2005

(65) Prior Publication Data

US 2006/0271837 A1 Nov. 30, 2006

Related U.S. Application Data

(60) Provisional application No. 60/686,037, filed on May 31, 2005.

(51) Int. Cl.
*G06F 17/00* (2006.01)
(52) U.S. Cl.
USPC .......................................... 715/249; 715/200
(58) Field of Classification Search
USPC .................... 715/249, 731–732, 200–203
See application file for complete search history.

(56) References Cited

U.S. PATENT DOCUMENTS

| 5,734,719 A | 3/1998 | Tsevdos et al. |
| 5,778,374 A | 7/1998 | Dang et al. |
| 5,787,254 A | 7/1998 | Maddalozzo et al. |
| 5,870,767 A | 2/1999 | Kraft, IV |
| 5,890,177 A | 3/1999 | Moody et al. |
| 5,906,397 A | 5/1999 | MacWilliams |
| 5,956,483 A | 9/1999 | Grate et al. |
| 6,029,141 A | 2/2000 | Bezos et al. |
| 6,044,385 A | 3/2000 | Gross et al. |
| 6,055,544 A | 4/2000 | DeRose et al. |
| 6,167,435 A | 12/2000 | Druckenmiller et al. |
| 6,177,936 B1 | 1/2001 | Cragun |
| 6,344,853 B1 * | 2/2002 | Knight .......................... 345/629 |
| 6,463,445 B1 * | 10/2002 | Suzuki et al. ................. 707/200 |

(Continued)

FOREIGN PATENT DOCUMENTS

GB 2149544 A 12/1985

OTHER PUBLICATIONS

"BSD Kernel Interfaces Manual-PTY(4)", Mac OS X Man Pages, original publication, Nov. 30, 1993.

(Continued)

*Primary Examiner* — Manglesh M Patel
(74) *Attorney, Agent, or Firm* — Arent Fox LLP (57) ABSTRACT

Provided herein are exemplary embodiments of a system and method of enabling a content author, such as an instructor, to rapidly create interactive, educational content for use in an online environment, without a costly pre-production or post-production process. In one embodiment, the system comprises a network, a library of interactive template files in a first file format, such as .swf; at least one authoring device coupled to the network, capable of recording a plurality of audio visual content segments in a second file format, such as .avi, and providing one or more of the interactive template files; and a device for converting the audio visual content segments in the second file format to files in the first file format. The authoring device is also adapted to assign a defined run order to the files in the first file format.

47 Claims, 10 Drawing Sheets

(56) References Cited

U.S. PATENT DOCUMENTS

| | | | |
|---|---|---|---|
| 6,585,776 B1 | 7/2003 | Bates et al. | |
| 6,683,631 B2 | 1/2004 | Carroll | |
| 6,891,551 B2 | 5/2005 | Keeley et al. | |
| 6,976,028 B2* | 12/2005 | Fenton et al. | 707/102 |
| 7,039,643 B2* | 5/2006 | Sena et al. | 707/101 |
| 7,181,468 B2* | 2/2007 | Spring et al. | 707/104.1 |
| 7,185,274 B1 | 2/2007 | Rubin et al. | |
| 2001/0050681 A1* | 12/2001 | Keys et al. | 345/418 |
| 2002/0120939 A1* | 8/2002 | Wall et al. | 725/87 |
| 2002/0194195 A1* | 12/2002 | Fenton et al. | 707/104.1 |
| 2003/0124502 A1* | 7/2003 | Chou | 434/350 |
| 2003/0152904 A1* | 8/2003 | Doty, Jr. | 434/350 |
| 2003/0200145 A1* | 10/2003 | Krassner et al. | 705/14 |
| 2003/0236836 A1* | 12/2003 | Borthwick | 709/204 |
| 2004/0039934 A1* | 2/2004 | Land et al. | 713/200 |
| 2004/0201609 A1* | 10/2004 | Obrador | 345/723 |
| 2004/0215658 A1* | 10/2004 | Carnegie et al. | 707/104.1 |
| 2004/0219494 A1* | 11/2004 | Boon | 434/156 |
| 2004/0268224 A1* | 12/2004 | Balkus et al. | 715/500.1 |
| 2005/0114784 A1* | 5/2005 | Spring et al. | 715/762 |
| 2006/0204942 A1* | 9/2006 | Kimball | 434/307 R |
| 2006/0259239 A1* | 11/2006 | Nouri | 701/211 |
| 2007/0016657 A1* | 1/2007 | Ito | 709/219 |
| 2007/0038717 A1* | 2/2007 | Burkholder et al. | 709/206 |
| 2007/0174425 A1* | 7/2007 | Gousse et al. | 709/217 |
| 2007/0220024 A1* | 9/2007 | Putterman et al. | 707/101 |
| 2008/0085102 A1* | 4/2008 | Alm et al. | 386/125 |

OTHER PUBLICATIONS

Sandrick, Karen, "Internet marketing: Software for the hard sell," Health Management Technology, Oct. 1998, vol. 19, No. 11, 6 pages.

* cited by examiner

FIG. 1

FIG. 2
Define
Content
Project

FIG. 3
Define
Content
Project

FIG. 4
TAXONOMY

FIG. 5
CONTENT
ASSIGNMENTS

FIG. 6
USER ASSIGNMENTS

FIG. 7

FIG. 8
QUALITY
CONTROL

CONTENT AUTHORING SYSTEM AND METHOD

CROSS-REFERENCE TO RELATED APPLICATIONS

This application claims the benefit of priority to U.S. Application No. 60/686,037 filed on May 31, 2005, the entire disclosure of which is hereby incorporated by reference as if set forth at length herein.

STATEMENT REGARDING FEDERALLY SPONSORED RESEARCH OR DEVELOPMENT

Not applicable

FIELD OF THE INVENTION

The present invention relates, in general, to content authoring systems and methods.

BACKGROUND AND SUMMARY OF THE INVENTION

Several content authoring application products exist today and include those from Macromedia, Inc. However, presently, there is a need for a network system, preferably web/Internet based, that rapidly collects, manages and distributes interactive multimedia content in a multiple-project basis. Such a system should collect content in real-time for immediate distribution.

The present invention addresses the above need and provides an innovative solution for rapid, cost-effective content collection, content management, and content delivery via the Internet. Specifically, the present invention enables a teacher-author to rapidly create interactive, educational content for use in an online environment, without a lengthy and costly pre-production or post-production process requiring the skills of an experienced programmer.

The web-based technology platform of the present invention supports the entire content workflow from end-to-end, streamlining the process and communication between content administrators, content authors and processors. The content is available to the end-user via the Internet.

In accordance with one aspect, the system of the present invention comprises a network, a library of interactive template files in a first file format, such as .swf; at least one authoring device coupled to the network, capable of recording a plurality of audio visual content segments in a second file format, such as .avi, and providing one or more of the interactive template files; and a device for converting the audio visual content segments in the second file format to files in the first file format. The authoring device is also adapted to assign a defined run order to the files in the first file format.

In accordance with a second aspect, the system further includes a user playback device coupled to the network, capable of receiving and executing the files in the first file format in the defined run order.

In accordance with a third aspect, the system also includes a database for storing at least some of the files in the first file format together with said defined run order.

In accordance with a fourth aspect, the authoring device is a pen-driven input device such as a tablet PC.

These and other aspects, features and advantages of the present invention will become better understood with regard to the following description, appended claims, and accompanying drawings.

BRIEF DESCRIPTION OF THE DRAWINGS

Embodiments of the present invention will now be briefly described with reference to the drawings in which.

DESCRIPTION OF THE INVENTION

The aspects, features and advantages of the present invention will become better understood with regard to the following description with reference to the accompanying drawing(s). What follows are preferred embodiments of the present invention. It should be apparent to those skilled in the art that these embodiments are illustrative only and not limiting, having been presented by way of example only. All the features disclosed in this description may be replaced by alternative features serving the same purpose, and equivalents or similar purpose, unless expressly stated otherwise. Therefore, numerous other embodiments of the modifications thereof are contemplated as falling within the scope of the present invention as defined herein and equivalents thereto.

System Platform

Figure 1:
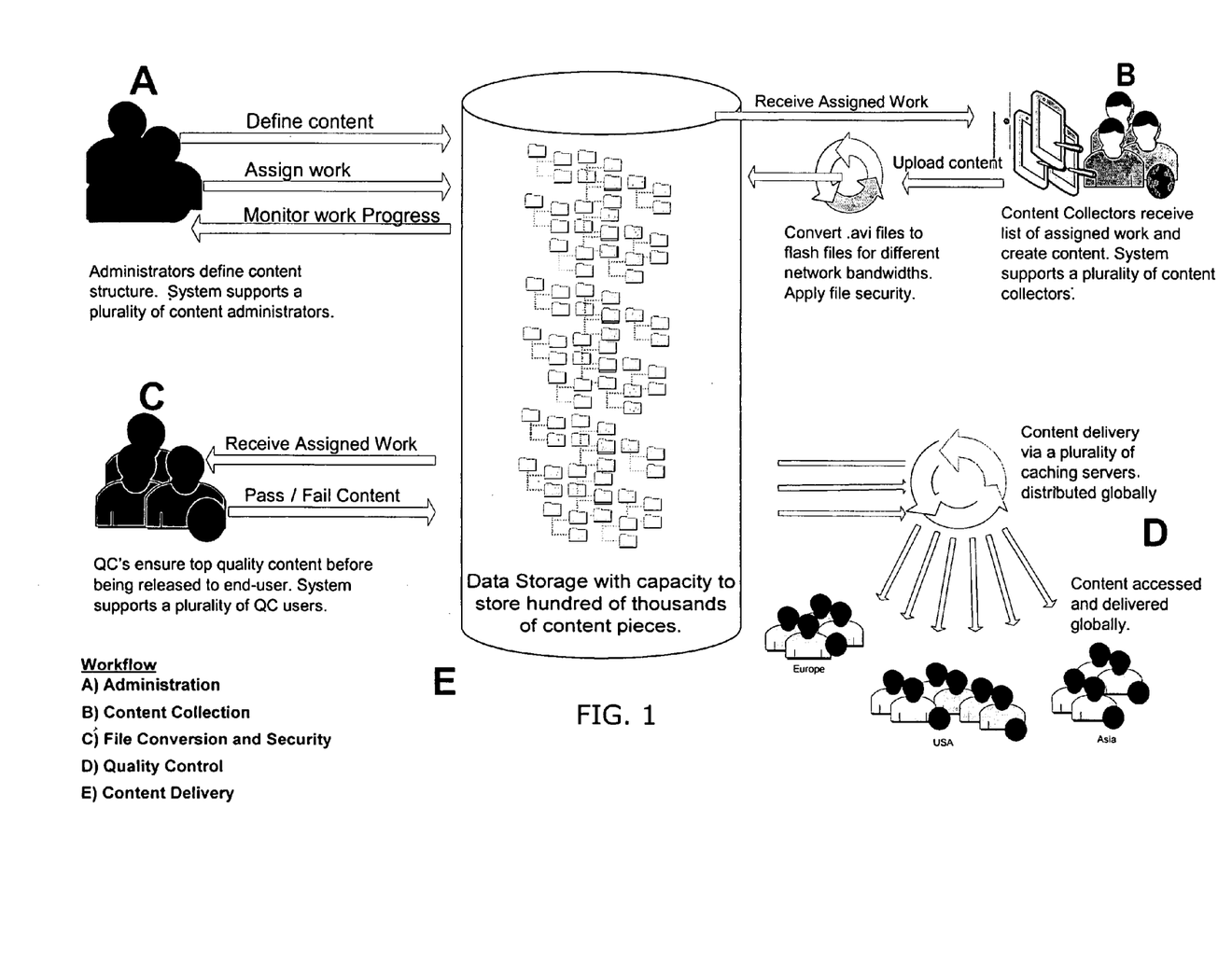
FIG. 1 depicts a high level network diagram of a system in accordance with the present invention.
Figure 2:
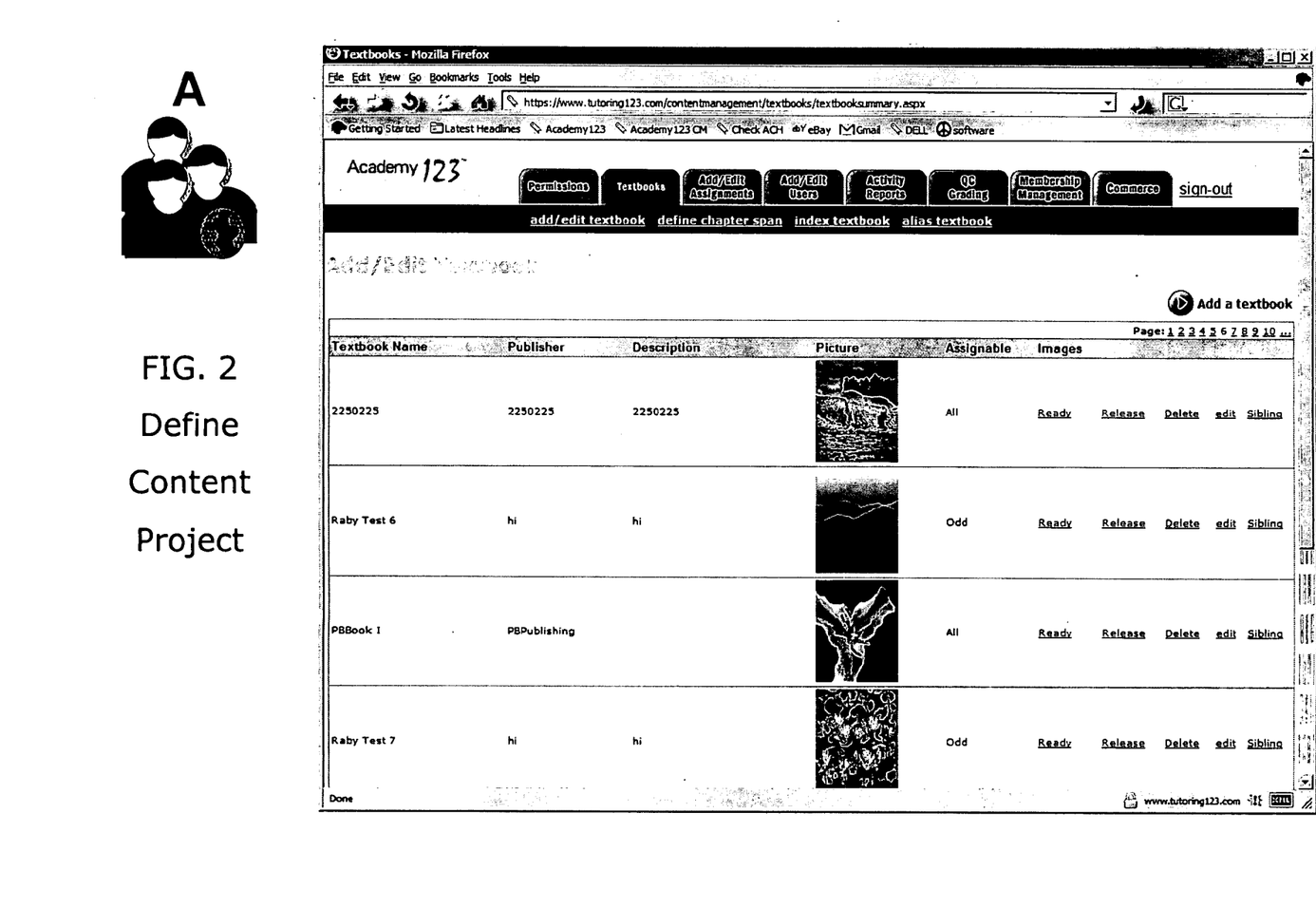
FIG. 2 depicts an exemplary Client A user interface (CONTENT PROJECT DEFINITION) in accordance with the present invention.
Figure 3:
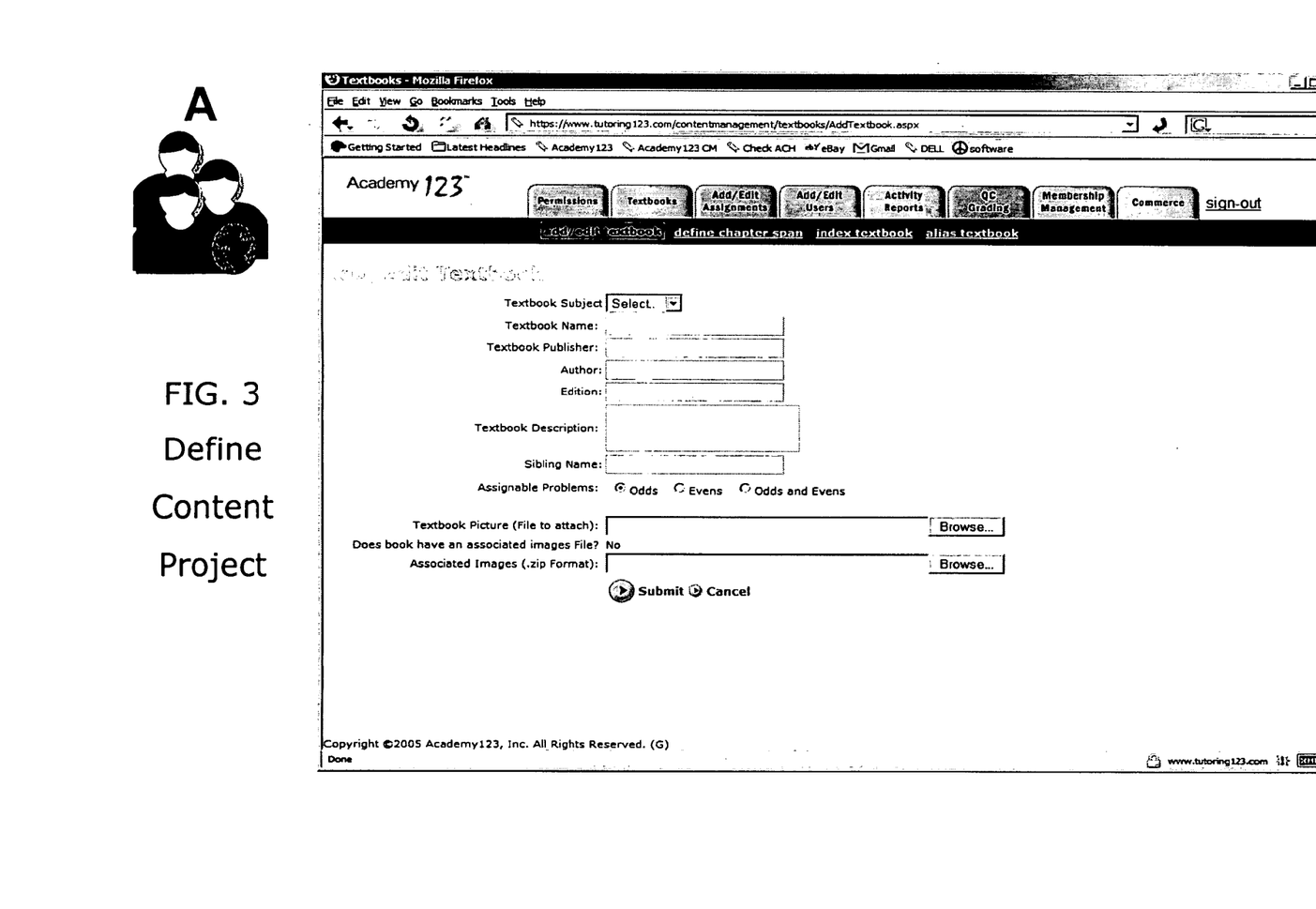
FIG. 3 depicts a further Client A user interface (CONTENT PROJECT DEFINITION) in accordance with the present invention.
Figure 4:
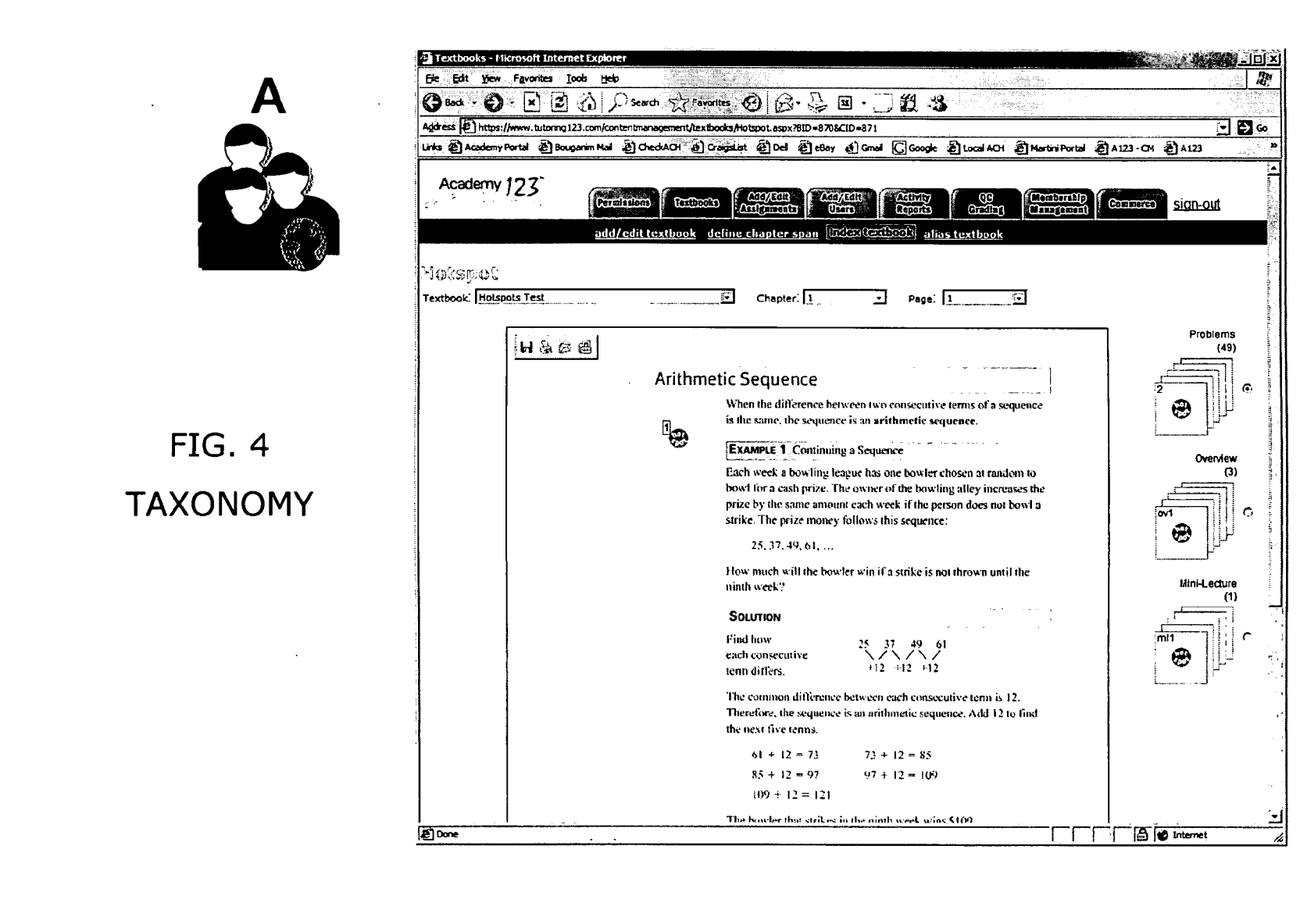
FIG. 4 depicts an alternate Client A user interface (TAXONOMY) in accordance with the present invention.
Figure 5:
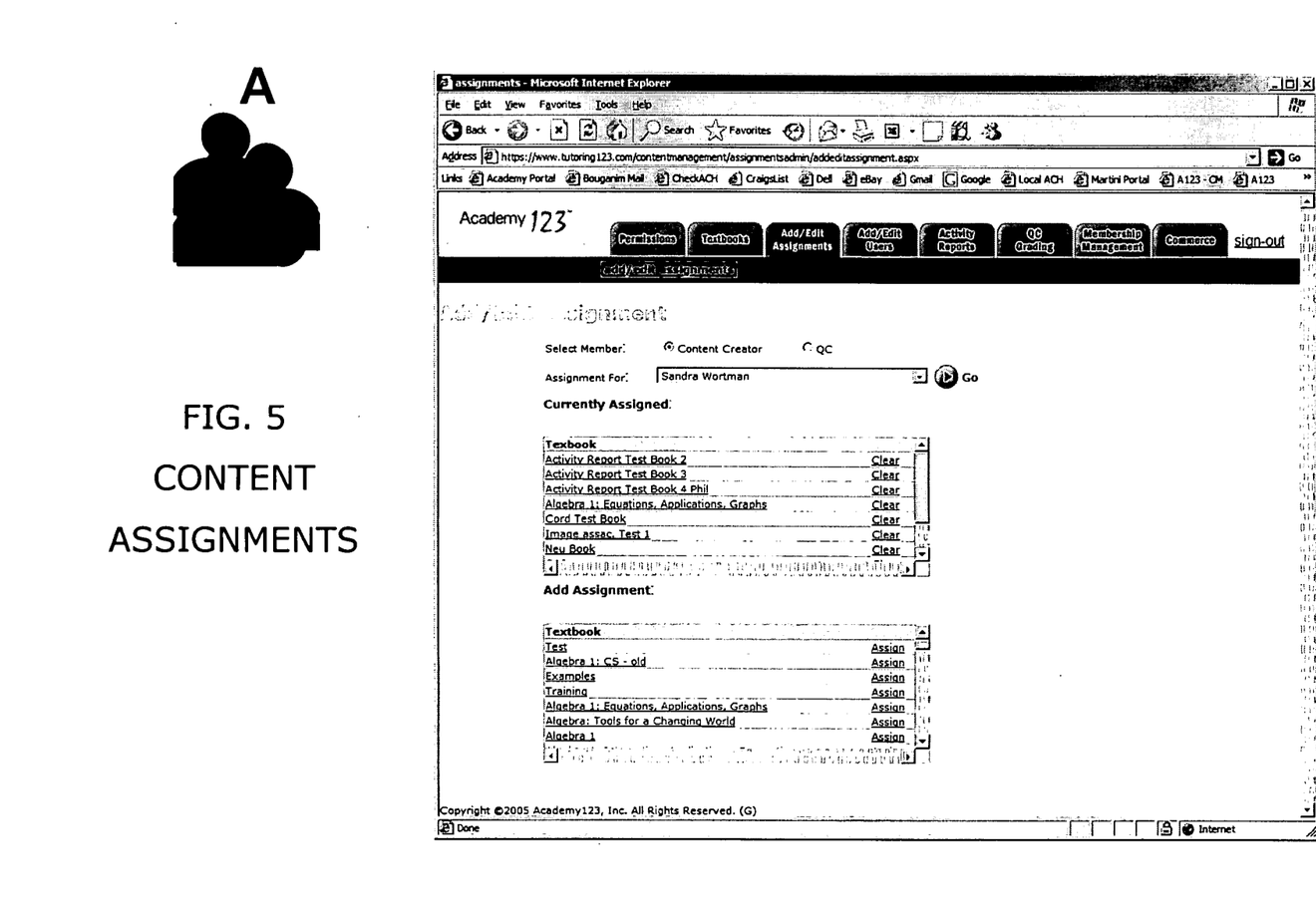
FIG. 5 depicts an additional Client A user interface (CONTENT ASSIGNMENTS) in accordance with the present invention.
Figure 6:
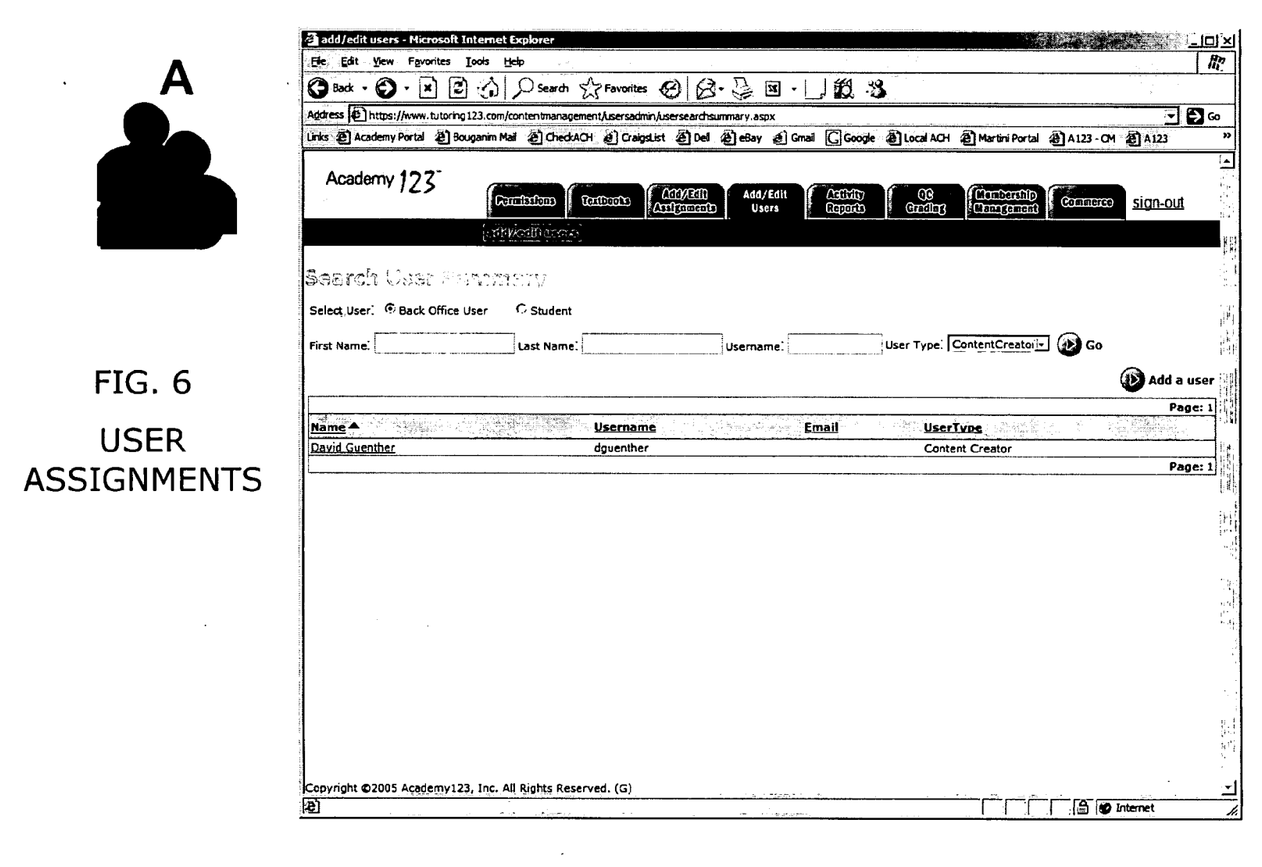
FIG. 6 depicts another Client A user interface (USER ASSIGNMENTS) in accordance with the present invention.

FIG. 1 is a high-level platform diagram of an exemplary system according to the principles of the present invention. Generally, the system includes a plurality of clients A, B, C, and D, in communication, via a communications medium, with a data center E comprising at least one server processor and database.

The communications medium can be any appropriate network configuration that provides effective data communication among network components. The Internet or other wide area/global area network is the preferred communication channel. Other suitable examples, include, but are not limited to, a local area network, a satellite or wireless communications network, a commercial value added network (VAN), ordinary telephone lines, private leased lines or any combination of the foregoing.

The data center E utilizes a processor having the capability of handling server applications and real-time, multi-tasking, remote-access database applications. The data center provides a conduit for the collection and transfer of content among clients, and in the process also provides data storage for a plurality of content pieces.

Generally, clients A, B, C, and D can be any form of computer system having the requisite processing power and input and output (I/O) functionality. Suitable systems include but are not limited to, main-frame systems, super-mini systems, mini-computer systems, work stations, desktop systems, laptop systems, hand held devices, or other mobile/portable devices, etc. In preferred embodiment, clients A, B, C, D support Internet browsing technology, such as Internet Explorer™, Netscape™, FireFox™, and the like. Specific features of each client A, B, C, and D follows.

Clients A can be any form of computer system having requisite data processing power, I/O functionality and audio and video capability. The client A also includes a network interface for communicating with network components such as the data center.

The client A includes programming instructions to enable an administrator-user to, among other things, define a content project, e.g., a textbook, develop and manage a table of contents or index for the content project (taxonomy), assign content pieces to one or more authors, generate reports and provide other back office management functions including, but not limited to: monitoring and managing content projects, users, work assignments, index (taxonomy) management using e.g., links and, hotspots; and automatic processing of new content.

FIGS. 2-6 depict exemplary screenshots of the features embodying client A.

Clients B can be any form of computer system having requisite processing power, input/output functionality and audio/video capability. Clients B also include a network interface for communicating with network components such as the data center.

In a preferred embodiment, a client B is a tablet personal computer or PC running Microsoft Windows and including headphone and microphone I/O support. Typically, a tablet PC is a small, pen-driven computer system. The pen can control the computer and perform document processing without using a keyboard or mouse. The tablet PC may have a touch display panel. To operate the tablet PC, which is similar to common writing types, a special pen is used with a touch display screen to perform various operating procedures.

Figure 7:
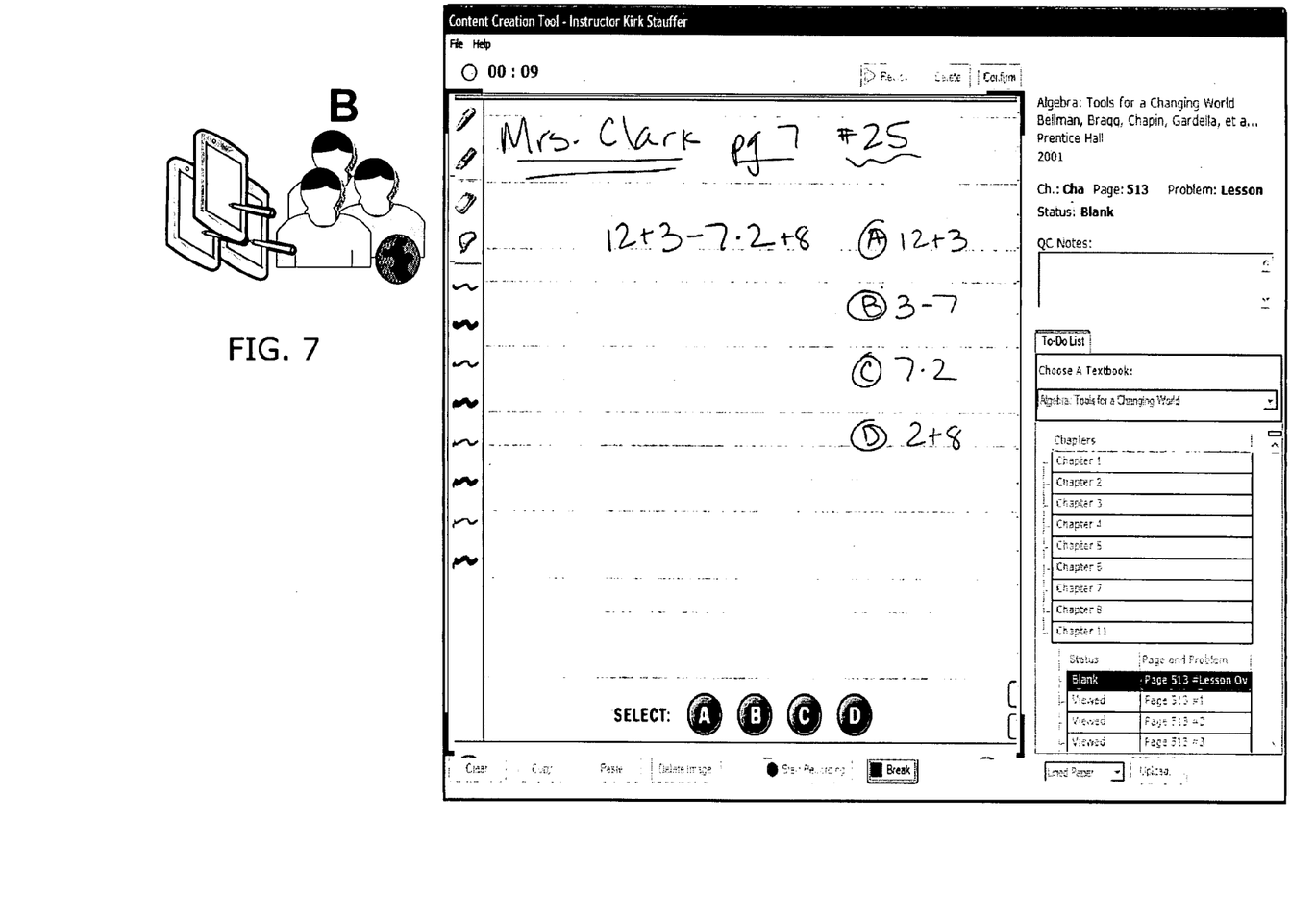
FIG. 7 depicts an exemplary Client B user interface in accordance with the present invention.

The client B includes content authoring programming instructions to enable an author to, among other things, communicate with the data center, record voice and handwriting ink strokes; review and edit content; insert and/or embed existing content; copy and paste images from any source: e.g., textbooks, documents, etc; insert interactions, such as pause, multiple choice, etc; and upload content to the data center.

FIG. 7 depict an exemplary screenshot of the features embodying client B.

Clients C can be any form of computer system having requisite data processing power, I/O functionality and audio and video capability. The client C also includes a network interface for communicating with network components such as the data center.

Figure 8:
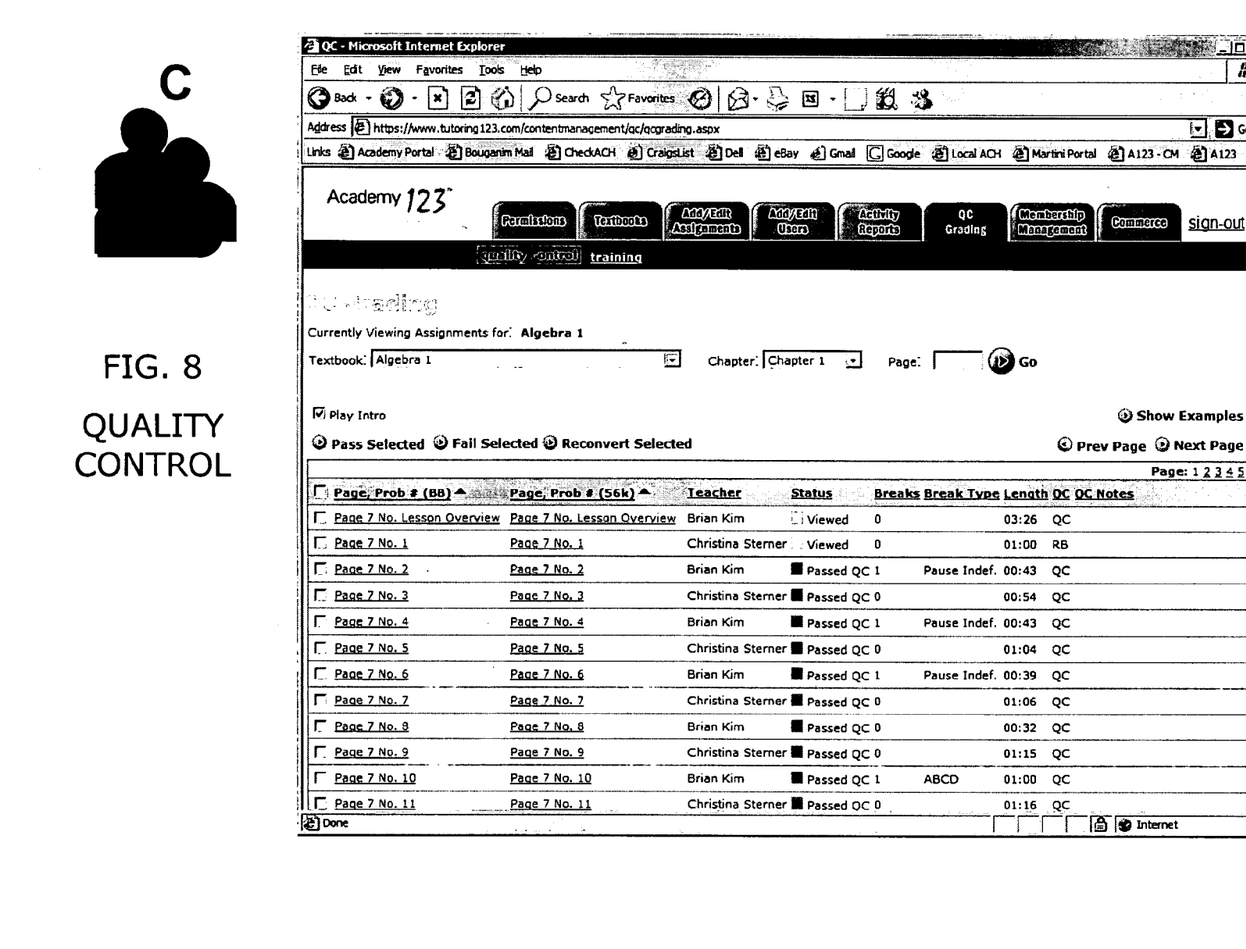
FIG. 8 depicts an exemplary Client C user interface in accordance with the present invention.

The client C includes programming instructions to enable users to receive, review and control the quality of the content pieces (e.g., via pass/fail system) being generated for the content projects.

FIG. 8 depicts an exemplary screenshot of the features embodying client C.

Clients D can be any form of computer system having the requisite processing power, input/output functionality and audio/video capability. Suitable systems include, but are not limited to, main-frame systems, super-mini systems, mini-computer systems, work stations, desktop systems, laptop systems, hand held devices, or other mobile/portable devices, etc. The client D also includes a network interface for communicating with network components.

Figure 9:
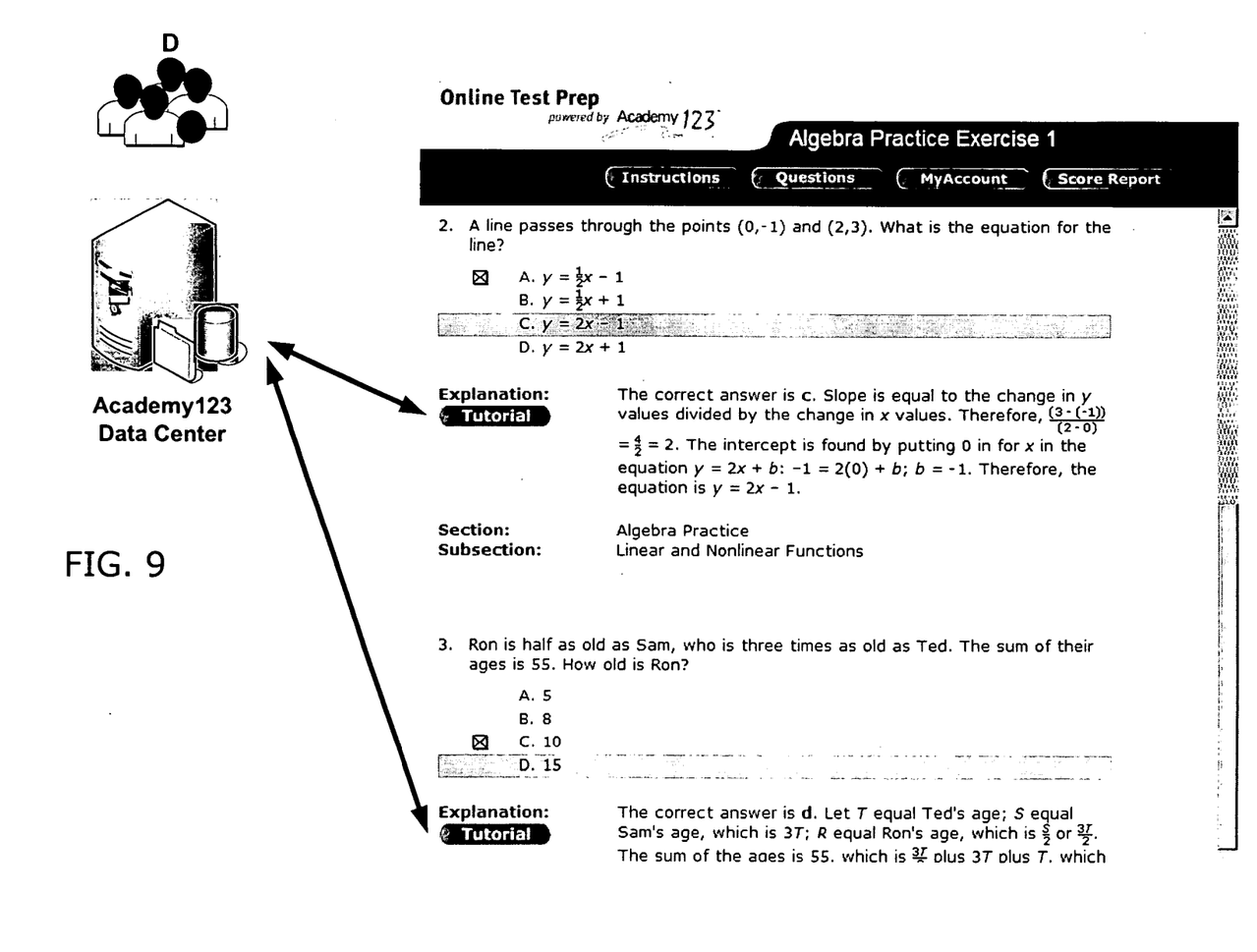
FIG. 9 depicts an exemplary Client D interface in accordance with the present invention.
Figure 10:
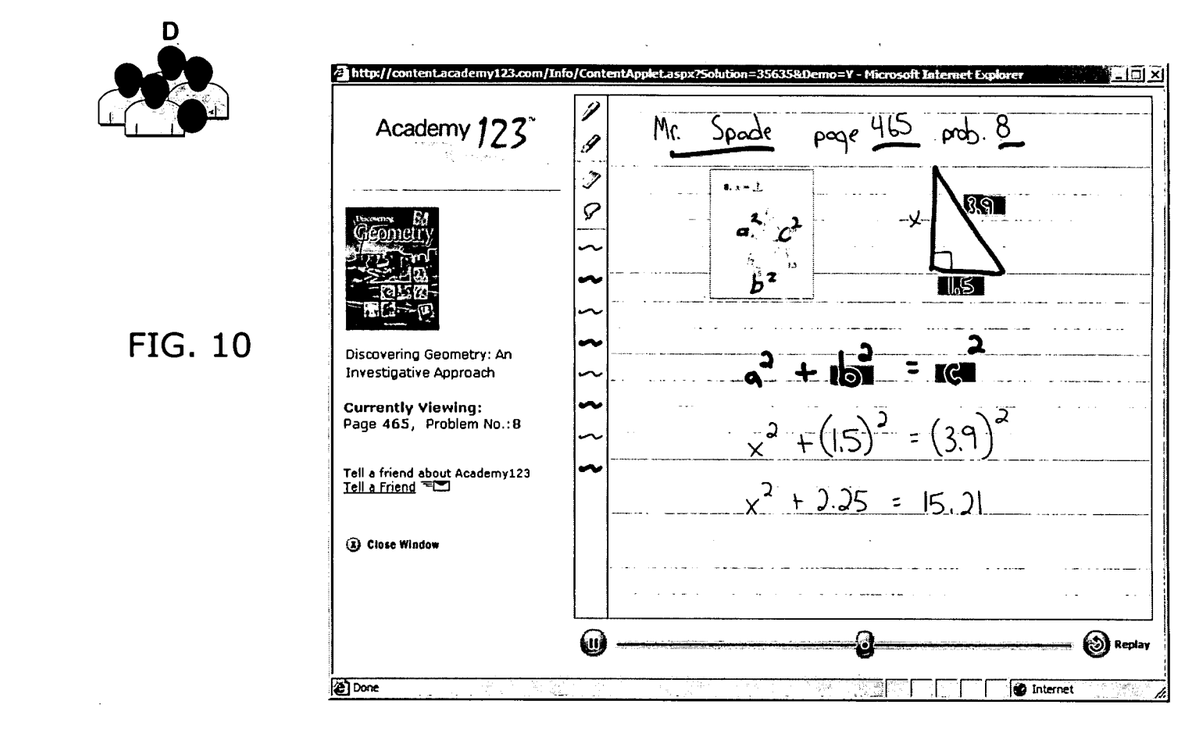
FIG. 10 depicts an additional Client D user interface in accordance with the present invention.

The client D includes programming instructions (e.g., in the form of browser-based applications (e.g., Internet Explorer™ and Netscape™ browsers) and media playback applications) to enable end users to execute at least portions of the content project.

FIGS. 9-10 depict exemplary screenshots of the features embodying client D. Each client D is adapted to execute the content project via an appropriate media player. As shown in FIG. 9, an end-user launches the content project by selecting an event button (e.g., the "tutorial" button). The client D next communicates with the data center E to retrieve the appropriate content segment and the client's media player executes the content segment on the client system. See FIG. 10.

For rapid deployment, the system utilizes global based content delivery and caching technology for delivering content from the data center to the clients D. Akamai Technologies, Inc., for example, provides a suitable global content delivery and caching application product.

Method of Operation

The first step in creating a content authoring and delivery sequence is to define a content project. An administrator logs into the system and defines a content project and the taxonomy associated with the content project. For example, where the task is to create a textbook, the title of the content project is the title of the textbook and the taxonomy of the content project is the table of contents or index—chapters, pages, and problem numbers that make up the structure of the particular textbook. The number of content pieces for the content project will be based on this pre-defined taxonomy.

Next, the administrator assigns the task of preparing the content pieces for the content project to one or more content authors. The scope of the assignment may range according to the taxonomy of the content project. Thus, a content project may be distributed among numerous content authors to create content pieces. For example, in the textbook case, a content author may be assigned the task of creating content pieces for entire textbook or only to a particular page in that textbook. Additionally, a content author may be assigned to create content pieces for multiple content projects with different assignment schemas.

Next, the administrator assigns the task of assuring the quality of each content piece in the system to one or more quality control (QC) users. The assignment schemas for the QCs may be totally independent from the assignment schemas of the content authors.

Next, a content author logs into the system. After successful authentication, the system presents the content author with a subset of the content project's taxonomy and a list the content pieces to which the content author is assigned.

Next, the content author uses the content authoring software to select a specific content piece and create recorded content. The recording can comprise handwriting, animation, voice, and pre-captured images bundled into audio-video files (e.g., .avi files). During a recording, the content author can pause the recording and insert an interaction, such as a Macromedia™ Learning Interaction, into the content piece. The content author selects an interaction from a library of interaction template files, examples of which include multiple-choice and all that apply items, (See, FIG. 7), yes/no items, true/false items, drag-and-drop matching items, hot-spot and hot-object items, text entry items and other interactions. The interaction is a separate flash file and each recorded segment before and after an interaction is a separate audio-video file. During the content creation process, the authoring device assigns a defined run order to the files. Thus, a content piece is a collection of recorded segments files and interaction files assembled in a logical order.

After recording one or more content pieces, the content author uploads the pieces to the data center servers. As the upload process iterates through each content piece folder, it deletes successfully uploaded files from the author's device and updates the data center database with relevant information.

Next, during the upload process to the server, the segment files are automatically converted into one or more flash files (e.g., Macromedia™ .swf files) optimized for various network bandwidths, e.g., broadband and 56K modem users. Optionally, the system may also add a security stub file to each of the converted segments. The stub file contains code that would ensure the viewing of the segment occurs within an appropriate media player.

Having now described preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the present invention may be implemented in hardware or software, or a combination of the two. Preferably, aspects of the present invention are implemented in one or more computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner. For illustrative purposes the present invention is embodied in the system configuration, method of operation and product or computer-readable medium, such as floppy disks, conventional hard disks, CD-ROMS, Flash ROMS, nonvolatile ROM, RAM and any other equivalent computer memory device. It will be appreciated that the system, method of operation and product may vary as to the details of its configuration and operation without departing from the basic concepts disclosed herein.

What is claimed is:

1. A system for creating interactive audio visual content via a network, comprising:

a library, interactive template files in a first file format being stored therein, each interactive template file defining an interaction;

at least one authoring device coupled to said network configured to receive a content piece assigned to the at least one authoring device, the at least one authoring device being further configured to create a recorded content associated with the received content piece, the recorded content including a plurality of audio visual content segments in a second file format and at least one of the interactive template files in the first format defining an interaction to be included in the recorded content; and a device for converting said audio visual content segments in said second file format to files in said first file format when said recorded content is uploaded to a server of the network from the at least one authoring device;

wherein said authoring device assigns a defined run order to said files in said first file format.

2. The system as in claim 1, further comprising:

a user playback device coupled to said network capable of receiving said files in said first file format and executing said files in said first file format in said defined run order.

3. The system as in claim 1, further comprising:

a database for storing at least some of said files in said first file format together with said defined run order.

4. The system as in claim 1, wherein said authoring device is a pen-driven input device.

5. The system as in claim 4, wherein said pen-driven input device is a tablet personal computer.

6. The system as in claim 1, wherein said user playback device is a personal computer.

7. The system as in claim 1, wherein said first file format is an ".swf" Macromedia flash file format.

8. The system as in claim 1, wherein said second file format is an ".avi" audio-visual file format.

9. The system of claim 1, wherein the plurality of authoring device further provide one or more of the plurality of templates.

10. The system of claim 1, wherein the at least one authoring device further uploads the created recorded content to a central database.

11. The system of claim 1, wherein the defined run order to said files in said first file format is assigned during the content creation process.

12. The system of claim 1, wherein the plurality of authoring devices further upload the created recorded contents to a central database.

13. A system for creating interactive audio visual content via a network, comprising:

a library, interactive template files in a first file format being stored therein, each interactive template file defining an interaction;

at least one first device coupled to said network capable of defining a table of contents of content pieces, each of said content pieces requiring a plurality of audio visual content segments and assigning ones of said content pieces to ones of a plurality of authors;

a plurality of authoring devices to be used by said plurality of authors, said plurality authoring devices coupled to said network and being configured to receive the content pieces assigned to the authoring devices, said plurality of authoring devices further configured to create recorded contents associated the received content pieces, the recorded content including a plurality of audio visual content segments in a second file format and at least one of the interactive template files in the first file format defining an interaction to be included in a recorded content; and a second device for converting said audio visual content segments in said second file format to files in said first file format when said recorded contents are loaded to a server of the network from the plurality of authoring devices, wherein said plurality of authoring devices assign a defined run order to said files in said first file format.

14. The system as in claim 13, further comprising:
a user playback device coupled to said network capable of receiving said files in said first file format and executing said files of a content piece in said first file format in said defined run order.

15. The system as in claim 13, wherein said authoring device is a pen-driven input device.

16. The system as in claim 15, wherein said pen-driven input device is a tablet personal computer.

17. The system as in claim 13, wherein said user playback device is a personal computer.

18. The system as in claim 13, wherein said first device is a personal computer.

19. The system as in claim 13, wherein said first file format is an ".swf" Macromedia flash file format.

20. The system as in claim 13, wherein said second file format is an ".avi" audio-visual file format.

21. The system of claim 13, wherein the plurality of authoring device further provide one or more of the plurality of templates.

22. The system of claim 13, wherein the plurality of authoring devices further upload the created recorded contents to a central database.

23. The system of claim 13, wherein the defined run order to said files in said first file format is assigned during the content creation process.

24. A method of creating interactive audio visual content via network, comprising:
defining a library of interactive template files in a first format, each interactive template file defining an interaction;
creating, using at least one authoring device coupled to said network, a recorded content based on a content piece assigned to the at least one authoring device, the recorded content including a plurality of audio visual content segments in a second file format and at least one of the interactive template files defining an interaction to be included in the recorded content;
converting, using a conversion device, said audio visual content segments in said second file format to files in said first file format when said recorded content is uploaded to a server of the network from the at least one authoring device; and
assigning, using said authoring device, a defined run order to said files in said first file format.

25. The method as in claim 24, further comprising:
receiving said files in said first file format, using a user playback device and executing said files in said first file format in said defined run order.

26. The method as in claim 24, further comprising:
storing as a database at least some of said files in said first file format together with said defined run order.

27. The method as in claim 24, wherein said authoring device is a pen-driven input device.

28. The method as in claim 27, wherein said pen-driven input device is a tablet personal computer.

29. The method as in claim 24, wherein said user playback device is a personal computer.

30. The method as in claim 24, wherein said first file format is an ".swf" Macromedia flash file format.

31. The method as in claim 24, wherein said second file format is an ".avi" audio-visual file format.

32. The system of claim 24, wherein the at least one authoring device further uploads the created recorded content to a central database.

33. The method of claim 24, wherein the defined run order to said files in said first file format is assigned during the content creation process.

34. A method of creating interactive audio visual content via a network, comprising the steps of:
defining a library of interactive template files in a first file format, each interactive template file defining an interaction;
defining, using at least one first device coupled to the network, a table of contents of content pieces, each of the content pieces requiring a plurality of audio visual content segments and assigning at least one of the content pieces to at least one of a plurality of authoring devices;
creating, using the plurality of authoring devices coupled to said network, recorded contents based on the content pieces assigned to the plurality of authoring devices, the recorded contents including the plurality of audio visual content segments and at least one of the interactive template files defining an interaction to be included in a recorded content;
converting, using a second device, said audio visual content segments in said second file format to files in said first file format when said recorded contents are uploaded to a server of the network from the plurality of authoring devices; and
assigning, using said plurality of authoring devices, a defined run order to said files in said first file format.

35. The method as in claim 34, further comprising:
receiving said files in said first file format using a user playback device and executing said files of a content piece in said first file format in said defined run order.

36. The method as in claim 34, wherein said authoring device is a pen-driven input device.

37. The method as in claim 36, wherein said pen-driven input device is a tablet personal computer.

38. The method as in claim 34, wherein said user playback device is a personal computer.

39. The method as in claim 34, wherein said first device is a personal computer.

40. The method as in claim 34, wherein said first file format is an ".swf" Macromedia flash file format.

41. The method as in claim 34, wherein said second file format is an ".avi" audio-visual file format.

42. The method of claim 34, wherein the defined run order to said files in said first file format is assigned during the content creation process.

43. A method of creating interactive audio visual content, comprising:
providing one or more interactive template file in a first file format, each interactive template file defining an interaction;
creating recorded contents, based on an assigned content piece, the recorded contents including a plurality of audio visual content segments in a second file format and at least one of the interactive template files defining an interaction to be included in the recorded content;

converting said audio visual content segments in said second file format to files in said first file format when said recorded contents are uploaded to a server of the network; and assigning a defined run order to said files in said first file format.

44. The method as in claim 43, further comprising: executing said files in said first file format in said defined run order.

45. The method as in claim 43, wherein said first file format is an ".swf" Macromedia flash file format.

46. The method as in claim 43, wherein said second file format is an ".avi" audio-visual file format.

47. The system of claim 43, further comprising loading the created recorded content to a central database.

* * * * *